(12) United States Patent
Karabinis

(10) Patent No.: US 7,636,566 B2
(45) Date of Patent: Dec. 22, 2009

(54) SYSTEMS AND METHOD WITH DIFFERENT UTILIZATION OF SATELLITE FREQUENCY BANDS BY A SPACE-BASED NETWORK AND AN ANCILLARY TERRESTRIAL NETWORK

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 679 days.

(21) Appl. No.: 11/082,458

(22) Filed: Mar. 17, 2005

(65) Prior Publication Data

US 2005/0239403 A1  Oct. 27, 2005

Related U.S. Application Data

(60) Provisional application No. 60/561,325, filed on Apr. 12, 2004.

(51) Int. Cl.
H04Q 7/20 (2006.01)

(52) U.S. Cl. ............. 455/427; 455/12.1; 455/13.2; 455/3.02

(58) Field of Classification Search ............... 455/12.1, 455/13.1, 13.2–13.4, 427, 426, 428, 429, 455/430, 436, 447, 448, 7, 446, 3.01, 3.02, 455/3.05, 426.1, 452.1, 450, 517, 509; 370/316, 370/321; 342/357.06–357.09

See application file for complete search history.

(56) References Cited

U.S. PATENT DOCUMENTS 4,901,307 A   2/1990  Gilhousen et al.

5,073,900 A   12/1991  Mallinckrodt (Continued)

FOREIGN PATENT DOCUMENTS

EP   0 506 255 A2   9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—John Lee
(74) *Attorney, Agent, or Firm*—Myers Bigel Sibley & Sajovec, P.A.

(57) ABSTRACT

A radioterminal communications system includes an ancillary terrestrial component configured to receive from at least some of a plurality of radioterminals using frequencies from a first satellite frequency band (e.g., an L-band) and to transmit to at least some of the plurality of radioterminals using frequencies from a second satellite frequency band (e.g., an S-band). The system further includes a space-based component configured to communicate with the plurality of radioterminals using at least some of the frequencies from the first satellite frequency band and/or at least some of the frequencies from the second satellite frequency band. In some embodiments the ancillary terrestrial component communicates with radioterminals using a Time Division Duplex (TDD) mode and the space-based component communicates with the same or other radioterminals using a Frequency Division Duplex (FDD) and/or a TDD mode.

15 Claims, 2 Drawing Sheets

U.S. PATENT DOCUMENTS

| | | | |
|---|---|---|---|
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,594,454 A * | 1/1997 | Devereux et al. | 342/357.09 |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,826,170 A * | 10/1998 | Hirschfield et al. | 455/13.4 |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,448,926 B1 * | 9/2002 | Weinberg et al. | 342/357.06 |
| 6,449,461 B1 | 9/2002 | Otten | |
| 6,522,865 B1 | 2/2003 | Otten | |
| 6,570,858 B1 * | 5/2003 | Emmons et al. | 370/321 |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 2001/0030956 A1 * | 10/2001 | Chillariga et al. | 370/348 |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054761 A1 | 3/2003 | Karabinis | |
| 2003/0054762 A1 * | 3/2003 | Karabinis | 455/12.1 |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2003/0224785 A1 | 12/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Karabinis et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260948 A1 * | 11/2005 | Regulinski et al. | 455/12.1 |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040659 A1 | 2/2006 | Karabinis | |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

International Search Report and Written Opinion of the International Searching Authority for International patent application No. PCT/US2005/012100 on Aug. 2, 2005.

* cited by examiner

SYSTEMS AND METHOD WITH DIFFERENT UTILIZATION OF SATELLITE FREQUENCY BANDS BY A SPACE-BASED NETWORK AND AN ANCILLARY TERRESTRIAL NETWORK

RELATED APPLICATION

The present invention claims the benefit of U.S. Provisional Application Ser. No. 60/561,325 entitled "Different Utilization of Satellite Frequency Bands By a Space-Based Network and An Ancillary Terrestrial Network," filed Apr. 12, 2004, which is hereby incorporated by reference herein in its entirety.

FIELD OF THE INVENTION

This invention relates to radioterminal communications systems and methods, and more particularly to terrestrial cellular and satellite cellular radioterminal communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna beam (antenna pattern) covering an entire area served by the system. Alternatively or in combination with the above, in cellular satellite radiotelephone communications systems and methods, multiple satellite beams (antenna patterns) are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward service link, and from the radiotelephone to the satellite over an uplink or return service link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "mobile terminal" or simply as a "terminal". As used herein, the term (s) "radioterminal," "radiotelephone," mobile terminal" and/ or "terminal" also include(s) any other radiating user device/ or equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s).

Cellular satellite communications systems and methods may deploy hundreds of cells, each of which corresponds to one or more spot beams, over their satellite footprint corresponding to a service area. It will be understood that large numbers of cells may be generally desirable, since the frequency reuse and the capacity of a cellular satellite communications system or method may both increase in direct proportion to the number of cells. Moreover, for a given satellite footprint or service area, increasing the number of cells may also provide a higher gain per cell, which can increase the link robustness and improve the quality of service.

Terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal(s) may be blocked by high-rise structures and/or may not penetrate into buildings. As a result, the satellite spectrum may be underutilized or unutilized in such areas. The terrestrial reuse of at least some of the satellite system frequencies can reduce or eliminate this potential problem.

Moreover, the capacity of a hybrid system, comprising satellite and terrestrial communications connectivity, may be increased by the introduction of terrestrial frequency reuse of at least some of the satellite system frequencies, since terrestrial frequency reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radioterminals for a satellite radioterminal system or method having a terrestrial communications capability by terrestrially reusing at least some of the same satellite frequency band and using substantially the same air interface for both terrestrial and satellite communications may be cost effective and/or aesthetically appealing. Conventional dual band/dual mode radioterminal alternatives, such as the well known Thuraya, Iridium and/or Globalstar dual mode satellite/terrestrial radioterminals, duplicate some components (as a result of the different frequency bands and/or air interface protocols between satellite and terrestrial communications), which leads to increased cost, size and/or weight of the radioterminal. See U.S. Pat. No. 6,052,560 to the present inventor Karabinis, entitled Satellite System Utilizing a Plurality of Air Interface Standards and Method Employing Same.

Satellite radioterminal communications systems and methods that may employ terrestrial reuse of satellite frequencies are described in U.S. Pat. No. 6,684,057 to Karabinis, entitled Systems and Methods for Terrestrial Reuse of Cellular Satellite Frequency Spectrum; and Published U.S. patent application Nos. US No. 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis (now U.S. Pat. No. 6,785,543), entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radioterminal communications systems and methods may employ satellites that use multiple bands for communications with radioterminals. For example, U.S. Patent Application Publication No. US 2003/0054762 to Karabinis, cited above, describes satellite radioterminal systems and communications methods that include a space-based component that is configured to communicate with radioterminals in a satellite footprint that is divided into satellite cells. The space-based component is configured to communicate with a first radioterminal in a first satellite cell over a first frequency band and/or a first air interface, and to communicate with a second radioterminal in the first or a second satellite cell over a second frequency band and/or a second air interface. An ancillary terrestrial network also is provided that is configured to communicate terrestrially with the first radioterminal over substantially the first frequency band and/or substantially the first air interface, and to communicate terrestrially with the second radioterminal over substantially the second frequency band and/or substantially the second air interface. See the Abstract of U.S. Patent Application Publication No. US 2003/0054762.

SUMMARY OF THE INVENTION

In some embodiments of the present invention, methods are provided for operating a radioterminal communications system including a space-based network (SBN), comprising a space-based component (SBC), and an ancillary terrestrial network (ATN) comprising one or more ancillary terrestrial components (ATCs). Communications from at least some of a plurality of radioterminals to the one or more ancillary terrestrial components use frequencies from a first satellite frequency band. Communications from the one or more ancillary terrestrial components to at least some of the plurality of radioterminals use frequencies from a second satellite frequency band. Communications between the space-based component and the plurality of radioterminals use at least some of the frequencies from the first satellite frequency band and/or at least some of the frequencies from the second satellite frequency band. The first satellite frequency band may include, for example, a first one of an L-band of frequencies and an S-band of frequencies, and the second satellite frequency band may include, for example, a second one of the L-band of frequencies and the S-band of frequencies.

Communicating between the space-based component and the plurality of radioterminals using at least some of the frequencies from the first satellite frequency band and/or at least some of the frequencies from the second satellite frequency band may include communicating between the space-based component and first radioterminals over forward links using frequencies from the first satellite frequency band and over return links using frequencies from the first satellite frequency band, and communicating between the space-based component and second radioterminals over forward links using frequencies from the second satellite frequency band and over return links using frequencies from the second satellite frequency band. Communicating from at least some of a plurality of radioterminals to the one or more ancillary terrestrial components using frequencies from a first satellite frequency band may include communicating from third radioterminals using frequencies from the first satellite frequency band. Communicating from the one or more ancillary terrestrial components to at least some of the plurality of radioterminals using frequencies from a second satellite frequency band may include communicating from the one or more ancillary terrestrial components to the third radioterminals using frequencies from the second satellite frequency band. The third radioterminals may include at least one of the first radioterminals and/or at least one of the second radioterminals.

In further embodiments, communicating between the space-based component and first radioterminals over forward links using frequencies from the first satellite frequency band and over return links using frequencies from the first satellite frequency band may include communicating from the space-based component to first ones of the first radioterminals using frequencies from the first satellite frequency band, and communicating from second ones of the first radioterminals to the space-based component using frequencies from the first satellite frequency band. Communicating between the space-based component and second radioterminals over forward links using frequencies from the second satellite frequency band and over return links using frequencies from the second satellite frequency band may include communicating from the space-based component to first ones of the second radioterminals using frequencies from the second satellite frequency band and communicating from second ones of the second radioterminals to the space-based component using frequencies from the second satellite frequency band.

According to other embodiments, communicating between the space-based component and first radioterminals over forward links using frequencies from the first satellite frequency band and over return links using frequencies from the first satellite frequency band may include communicating between a first satellite of the SBC and the first radioterminals over forward links using frequencies from the first satellite frequency band and return links using frequencies from the first satellite frequency band. Communicating between the space-based component and second radioterminals over forward links using frequencies from the second satellite frequency band and over return links using frequencies from the second satellite frequency band may include communicating between a second satellite of the SBC and the second radioterminals over forward links using frequencies from the second satellite frequency band and over return links using frequencies from the second satellite frequency band.

In additional embodiments of the present invention, an ancillary terrestrial network includes a first ancillary terrestrial component and a second ancillary terrestrial component. Communicating from at least some of a plurality of radioterminals to the ancillary terrestrial network using frequencies from a first satellite frequency band may include communicating from at least some of the radioterminals to the first ancillary terrestrial component using at least one of the frequencies from the first satellite frequency band. Communicating from the ancillary terrestrial network to at least some of the plurality of radioterminals using frequencies from a second satellite frequency band may include communicating from the second ancillary terrestrial component to at least some of the radioterminals using at least one of the frequencies from the second satellite frequency band.

Communications from the first ancillary terrestrial component to at least some of the radioterminals may use at least one of the frequencies from the first satellite frequency band, and communications from at least some of the radioterminals to the second ancillary terrestrial component may use at least one of the frequencies from the second satellite frequency bands. Communications services may be provided to radioterminals using the first and/or second ancillary terrestrial components in a common geographic region or over respective different geographic regions. In further embodiments, communications services may be provided to respective first and/or second classes and/or types of radioterminals using the first and/or second ancillary terrestrial components.

According to still further embodiments, the ancillary terrestrial network further includes a third ancillary terrestrial component. Communicating from at least some of a plurality of radioterminals to the ancillary terrestrial network using frequencies from a first satellite frequency band may include communicating from at least some of the radioterminals to the third ancillary terrestrial component using at least one of the frequencies from the first satellite frequency band. Communicating from the ancillary terrestrial network to at least some of the plurality of radioterminals using frequencies from a second satellite frequency band may include communicating from the third ancillary terrestrial component to at least some of the radioterminals using at least one of the frequencies from the second satellite frequency band. Communications services may be provided to radioterminals using the first, second and/or third ancillary terrestrial components in a common geographic region or over respective different geographic regions. In additional embodiments, communications services may be provided to respective first, second and/or third types and/or classes of radioterminals using the first, second and/or third ancillary terrestrial components.

According to additional embodiments of the present invention, methods are provided for operating a radioterminal communications system including a space-based network, comprising a space-based component, and an ancillary terrestrial network comprising one or more ancillary terrestrial components. The methods include communicating between the one or more ancillary terrestrial components and at least some of a plurality of radioterminals using frequencies from a first and/or second satellite frequency band in a Time Division Duplex (TDD) mode, and communicating between the space-based component and at least some of the plurality of radioterminals using frequencies from the first and/or second satellite frequency band in a Frequency Division Duplex (FDD) mode and/or a TDD mode. The first satellite frequency band may include a first one of an L-band of frequencies and an S-band of frequencies and the second satellite frequency band may include a second one of the L-band of frequencies and the S-band of frequencies.

In some embodiments of the present invention, a radioterminal communications system includes an ancillary terrestrial system/network/component configured to receive from at least some of a plurality of radioterminals using frequencies from a first satellite frequency band and to transmit to at least some of the plurality of radioterminals using frequencies from a second satellite frequency band. The radioterminal communications system further includes a space-based system/network/component configured to communicate with the plurality of radioterminals using at least some of the frequencies from the first satellite frequency band and/or at least some of the frequencies from the second satellite frequency band.

The space-based system/network/component may be configured to communicate with first radioterminals over forward links using frequencies from the first satellite frequency band and over return links using frequencies from the first satellite frequency band and to communicate with second radioterminals over forward links using frequencies from the second satellite frequency band and over return links using frequencies from the second satellite frequency band. The ancillary terrestrial system/network/component may be configured to receive from third radioterminals using frequencies from the first satellite frequency band and to transmit to the third radioterminals using frequencies from the second satellite frequency band.

In further embodiments, the space-based system/network/component is further configured to transmit to first ones of the first radioterminals using frequencies from the first satellite frequency band and to receive from second ones of the first radioterminals using frequencies from the first satellite frequency band. The space-based system/network/component may be further configured to transmit to first ones of the second radioterminals using frequencies from the second satellite frequency band and to receive from second ones of the second radioterminals using frequencies from the second satellite frequency band. The space-based system/network/component may also be configured to communicate between a first satellite of the space-based system/network/component and the first radioterminals over forward links using frequencies from the first satellite frequency band and over return links using frequencies from the first satellite frequency band and to communicate between a second satellite of the space-based system/network/component and the second radioterminals over forward links using frequencies from the second satellite frequency band and over return links using frequencies from the second satellite frequency band.

The ancillary terrestrial system/network/component may include a first ancillary terrestrial component configured to receive from at least some of the radioterminals using at least one of the frequencies from the first satellite frequency band, and a second ancillary terrestrial component configured to transmit to at least some of the radioterminals using at least one of the frequencies from the second satellite frequency band. The ancillary terrestrial system/network/component may also include a third ancillary terrestrial component configured to receive from at least some of the radioterminals using at least one of the frequencies from the first satellite frequency band and to transmit to at least some of the radioterminals using at least one of the frequencies from the second satellite frequency band.

DETAILED DESCRIPTION

Figure 1:
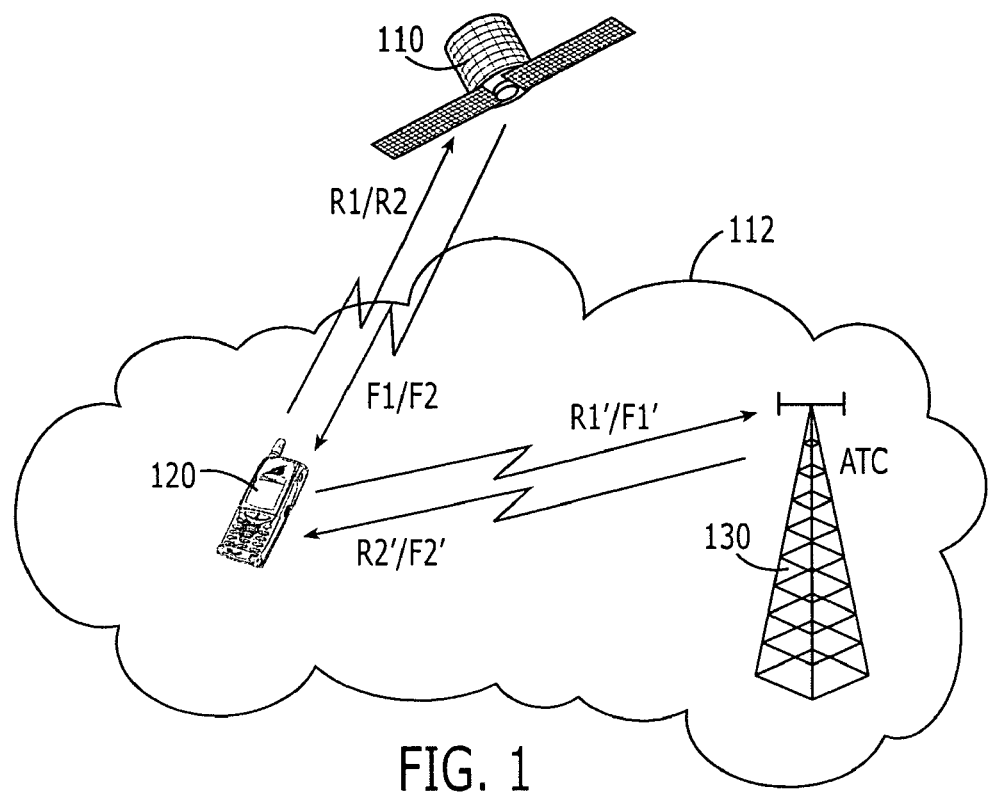
FIGS. 1-3 are schematic illustrations of wireless communications systems and operations thereof according to various embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although terms such as first and second may be used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or". Moreover, as used herein, "substantially the same" band(s) means that two or more bands being compared substantially overlap, but that there may be some areas of non-overlap, for example at a band end. Moreover, "substantially the same" air interface(s) means that two or more air interfaces being compared are similar but need not be identical. Some differences may exist between the two or more air interfaces to account, for example, for different characteristics between a terrestrial and satellite environment. For example, a different vocoder rate may be used (for example, approximately 9 to 13 kbps for terrestrial communications and approximately 2 to 4 kbps for satellite), a different forward error correction coding and/or a different interleaving depth may be used and/or different spread-spectrum codes.

A satellite radioterminal communications service provider may have or may acquire a license and/or authority to operate over at least some frequencies of a first satellite frequency band and over at least some frequencies of at least a second satellite frequency band. For example, the first satellite frequency band may be an L-band satellite frequency band and the second satellite frequency band may be an S-band satellite frequency band. Alternatively or in combination with the above, the satellite radioterminal communications service provider may have or may acquire a license and/or authority to operate over a first set of frequencies of a satellite frequency band and over at least a second set of frequencies of the satellite frequency band. As such, the service provider may request and receive regulatory authority to pool/aggregate at least some frequencies from each one of the at least two satellite frequency bands and/or first and second set of frequencies of the satellite frequency band and deploy systems and/or methods that may be operative over the pool/aggregate of the at least some frequencies from each of the at least two satellite frequency bands and/or the first and second set of frequencies of the satellite frequency band.

Some embodiments of the present invention provide satellite radioterminal communications systems and methods wherein multiple satellite frequency bands are used differently by a space-based network and an ancillary terrestrial network. More specifically, some embodiments of the present invention comprise a Space-Based Network (SBN) and an Ancillary Terrestrial Network (ATN) wherein the SBN and the ATN utilize the at least two satellite frequency bands in different ways. The SBN comprises at least one Space-Based Component (SBC), such as a satellite, that is operative to communicate with at least one satellite radioterminal over forward and return links of the first satellite frequency band and/or over forward and return links of the second satellite frequency band. The ATN comprises at least one Ancillary Terrestrial Component (ATC), and is operative to send information from at least one ATC radioterminal to the at least one ATC utilizing at least one frequency of the first satellite frequency band. The ATN is also operative to send information from the at least one ATC to the at least one ATC radioterminal utilizing at least one frequency of the second satellite frequency band. In sending information from the ATC radioterminal to the ATC, the at least one frequency utilized by the ATC radioterminal may be a frequency belonging to a forward and/or a return link of the first satellite frequency band. In sending information from the at least one ATC to the at least one ATC radioterminal, the at least one frequency utilized by the ATC may be a frequency belonging to a forward and/or a return link of the second satellite frequency band.

Figure 2:
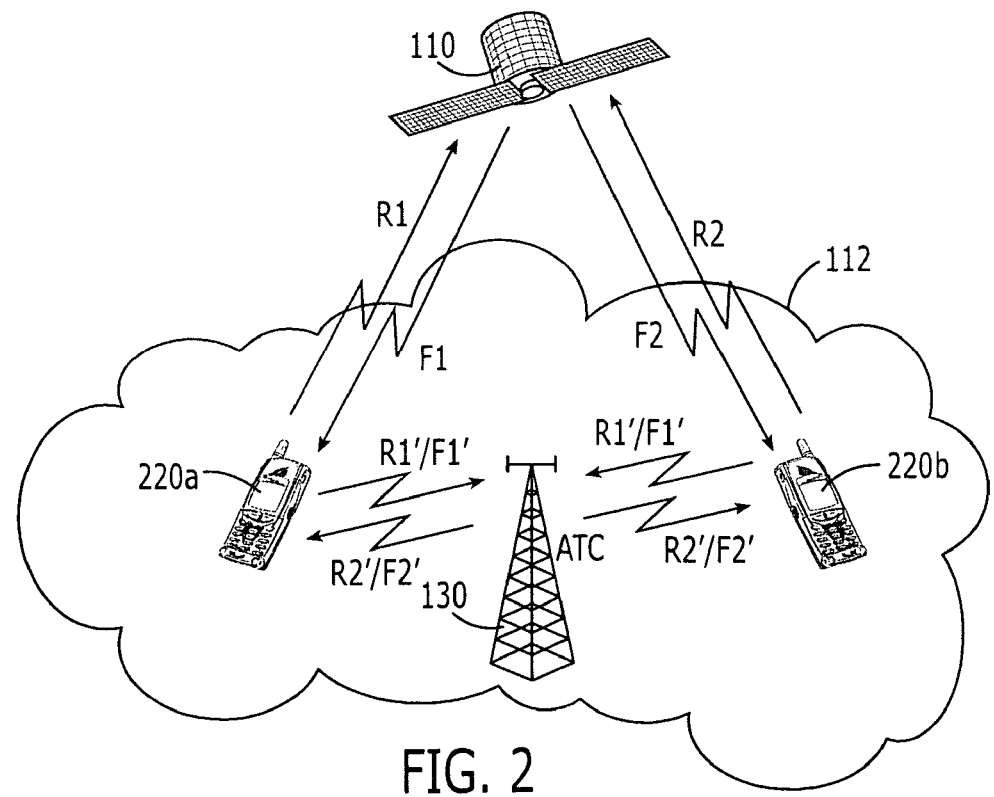
Figure 3:
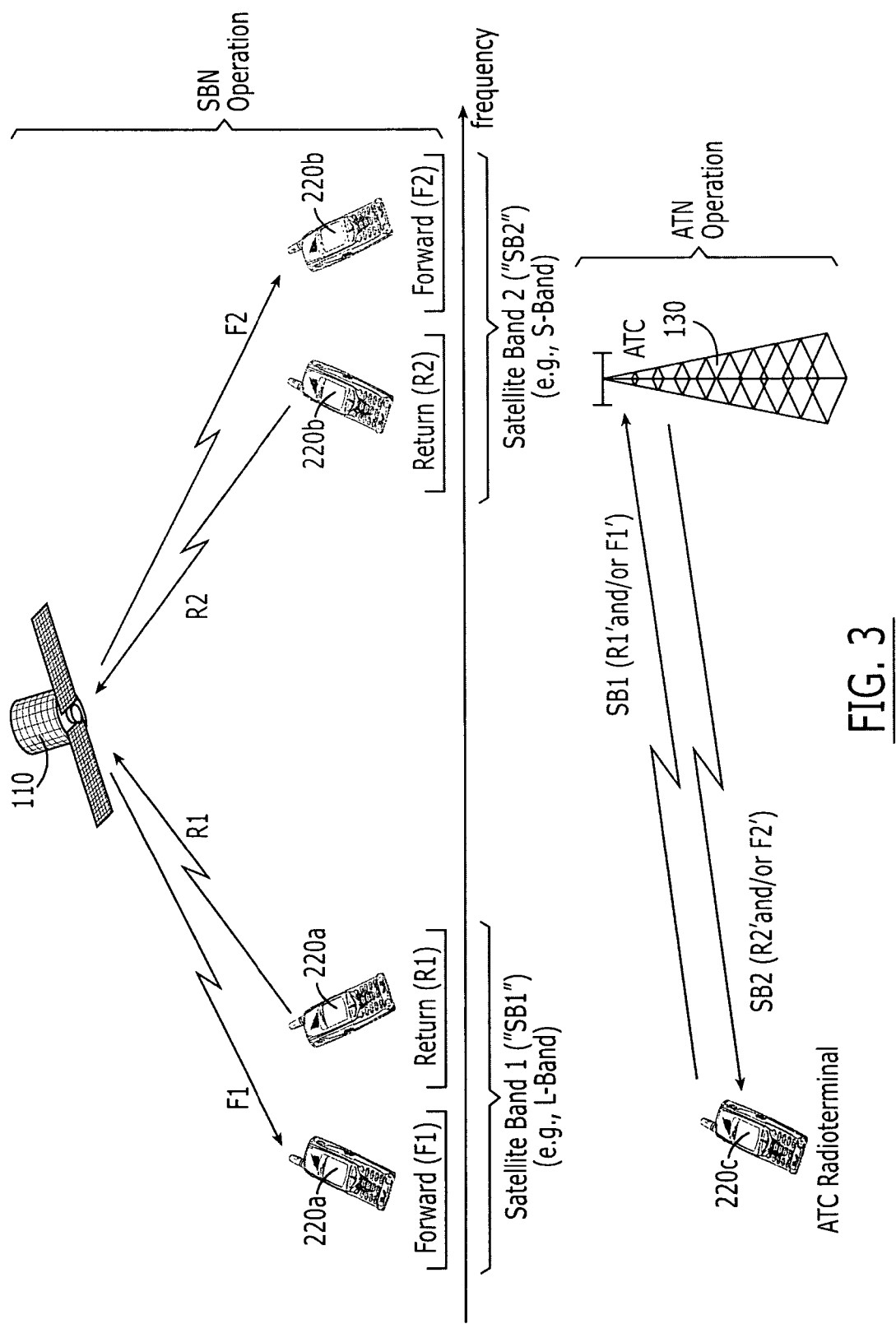

FIGS. 1-3 schematically illustrate satellite radioterminal communications systems and methods according to various embodiments of the present invention. More specifically, as shown in FIG. 1, a space-based component, such as a satellite 110, communicates with one or more radioterminals 120 over a satellite footprint 112. The radioterminals 120 are also configured to communicate with one or more ATCs 130 of an ATN, wherein the ATN may be geographically spaced apart from and/or at least partially overlapping with the satellite footprint 112.

Still referring to FIG. 1, the satellite 110 communicates with the radioterminal 120 using forward link frequencies in the first satellite band (F1) and/or forward link frequencies in the second satellite band (F2), denoted collectively by F1/F2. Also, the radioterminal 120 communicates with the satellite 110 using return link frequencies in the first satellite band (R1) and/or return link frequencies in the second satellite band (R2), collectively referred to as R1/R2.

Terrestrially, the radioterminals 120 transmit communications to one or more ATCs 130 using substantially the same return link frequencies in the first satellite band (R1') and/or substantially the same forward link frequencies in the first satellite band (F1'), collectively referred to as R1'/F1'. The ATCs 130 transmit communications to the radioterminals 120 using substantially the same return link frequencies of the second satellite band (R2') and/or substantially the same forward link frequencies of the second satellite band (F2'), collectively referred to as R2'/F2'.

Thus, the second satellite band, such as the S-band, may be used for forward link communications from the ATC 130 to the radioterminals 120, and the first satellite band, such as the L-band, may be used for return link communications from the radioterminals 120 to the ATC 130. Stated differently, in some embodiments of the present invention, the radioterminals 120 may not radiate terrestrially for the purpose of communicating with one or more ATCs 130 using frequencies of the second satellite band, such as the S-band and/or the ATCs 130 may not radiate terrestrially for the purpose of communicating with one or more radioterminals 120 using frequencies of the first satellite band, such as the L-band. Reduced interference potential may thereby be provided in some embodiments of the invention. It will also be understood that the prime (') notation may also indicate a subset of the unprimed frequency band, such as at least one frequency of the unprimed frequency band, in other embodiments of the present invention.

FIG. 2 illustrates other embodiments of the present invention, where two types of radioterminals 220a, 220b are provided that communicate with an ATC 130, and with a satellite 110. As shown in FIG. 2, the satellite 110 is configured to communicate with the first type of radioterminals 220a using forward and return link frequencies in the first satellite band (F1 and R1), and to communicate with the second radioterminals 220b using forward and return link frequencies in the second satellite band (F2 and R2). Both of the radioterminals 220a and 220b are configured to communicate with one or more ATCs 130 using the frequency bands that were described above in connection with FIG. 1. Accordingly, in some embodiments of FIG. 2, the radioterminals 220a and 220b may not radiate terrestrially for the purpose of communicating with one or more ATCs 130 using frequencies of the second satellite band, such as the S-band and/or the ATCs 130 may not radiate terrestrially for the purpose of communicating with one or more radioterminals 120a, 120b using frequencies of the first satellite band, such as the L-band.

FIG. 3 illustrates other embodiments of the present invention from the separate standpoints of SBN operation and ATN operation. SBN operation also is illustrated relative to the frequencies it uses. More specifically, as shown at the top of FIG. 3, a satellite 110 communicates with first radioterminals 220a using a forward link frequency from the first satellite band (F1) and a return link frequency from the first satellite band R1, such as the L-band. It is understood that the two radioterminals 220a that are illustrated as separate units in FIG. 3 may be the same radioterminal unit. The satellite 110 also communicates with second radioterminals 220b over a forward link frequency (F2) and a return link frequency (R2) from the second satellite band, such as S-band. Here, also, it is understood that the two radioterminals 220b that are illustrated as separate units in FIG. 3 may be the same radioterminal unit. It is further understood that instead of configuring a single satellite, as illustrated in FIGS. 1 through 3; to communicate with radioterminals using frequencies of the first and/or second satellite frequency band(s), the SBN may comprise two or more satellites where at least one satellite is configured to communicate with radioterminals using at least some frequencies of the first satellite band, such as the L-band, and where at least a second satellite is configured to communicate with radioterminals using at least some frequencies of the second satellite band, such as the S-band. As shown at the bottom of FIG. 3, in ATN operation, an ATN radioterminal 220c, which may be the same or different from radioterminals 220a and/or 220b, communicates with an ATC 130 using substantially the first satellite band SB1, or at least a portion thereof, for return link communications and substantially the second satellite band SB2, or at least a portion thereof, for forward link communications. The ATN terminals 220c therefore do not radiate terrestrially to communicate with the ATC(s) 130 using frequencies of the second satellite band, such as the S-band, and the ATC(s) 130 does/do not radiate terrestrially to communicate with the radioterminal(s) 220c using frequencies of the first satellite band, such as the L-band, in some embodiments of FIG. 3.

In other embodiments, the ATN may be configured with at least one first and/or at least one second type of ATC. The at least one first type of ATC may be configured to communicate with at least one radioterminal by radiating at least one frequency of the first satellite band forward link(s) and to receive communications from at least one radioterminal by receiving at least one frequency of the first satellite band return link(s). The at least one second type of ATC may be configured to communicate with at least one radioterminal by radiating at least one frequency of the second satellite band forward link(s) and to receive communications from at least one radioterminal by receiving at least one frequency of the second satellite band return link(s). The at least one first and the at least one second ATC may be deployed to provide communications service to radioterminals over a common, substantially common, or different geographic areas.

In still other embodiments, the ATN may be configured with at least one first and/or at least one second and/or at least one third type of ATC. The at least one first type of ATC may be configured to communicate with at least one radioterminal by radiating at least one frequency of the first satellite band forward link(s) and to receive communications from at least one radioterminal by receiving at least one frequency of the first satellite band return link(s). The at least one second type of ATC may be configured to communicate with at least one radioterminal by radiating at least one frequency of the second satellite band forward link(s) and to receive communications from at least one radioterminal by receiving at least one frequency of the second satellite band return link(s). The at least one third type of ATC may be configured to communicate with at least one radioterminal by radiating at least one frequency of the second satellite band forward and/or return link(s) and to receive communications from at least one radioterminal by receiving at least one frequency of the first satellite band return and/or forward link(s). The at least one first, second and/or third ATC may be deployed to provide communications service to radioterminals over a common, substantially common, or different geographic areas. For example, the at least one first type of ATC may be deployed to provide service to radioterminals in New York, the at least one second type of ATC may be deployed to provide service to radioterminals in Boston, and the at least one third type of ATC may be deployed to provide service to radioterminals in Los Angeles. Alternatively, all three ATC types, or any two of the three ATC types may be deployed in the same or substantially the same geographic area to provide service to different classes/types of radioterminals and/or to one class/type of radioterminals.

In further embodiments, the ATN may be configured with at least one ATC that is configured to communicate with at least one radioterminal in a Time Division Duplex (TDD) mode using any set of frequencies of a first satellite frequency band and/or a second satellite frequency band. For example, such an ATC may communicate with at least some of a plurality of radioterminals using frequencies from the first and/or second satellite frequency band in a TDD mode, while a space-based component is configured to communicate with at least some of the plurality of radioterminals using frequencies from the first and/or second satellite frequency band in a Frequency Division Duplex (FDD) mode. A SBN, SBC, ATN and/or ATC may be configured to establish preferential communications with radioterminals by using preferentially the first and/or second satellite frequency band and/or a portion of a satellite frequency band. The SBN, SBC, ATN and/or ATC may each be configured to selectively reuse frequencies geographically and the SBN, SBC, ATN and ATC may each be configured to selectively reuse frequencies geographically differently. For a given frequency, the selective geographic frequency reuse of the given frequency by the SBN, SBC, ATN, and/or ATC may be the same or different.

In accordance with additional embodiments wherein the ATN and/or at least one ATC is/are configured to communicate with radioterminals using a TDD air interface protocol in conjunction with a SBN and/or a SBC that is/are configured to communicate with the same and/or other radioterminals using a FDD and/or a TDD air interface protocol(s), the SBN, SBC, ATN, the at least one ATC and/or at least one radioterminal may be configured and/or responsive to establish preferential communications between the ATN and/or the at least one ATC and the radioterminal over a first geographic area and/or time period and the SBN, SBC, ATN, the at least one ATC and/or at least one radioterminal may be configured and/or responsive to establish preferential communications between the SBN and/or the SBC and the radioterminal over a second geographic region and/or time period (such as a time period associated with an emergency). In further embodiments, the ATN and/or at least one ATC may be configured to transmit information to radioterminals using a polarization that is substantially orthogonal and/or different relative to a polarization used by the SBN and/or the SBC to communicate with at least some radioterminals. In some embodiments, a radioterminal communicating with the ATN and/or at least one ATC is configured to radiate and/or receive electromagnetic waveform(s) to/from the ATN and/or the at least one ATC in a substantially linearly-polarized and/or circularly-polarized spatial orientation(s) using one or more antenna(s) and/or antenna elements that may be substantially orthogonally-polarized, differently polarized and/or spaced apart and the ATN and/or the at least one ATC may be configured to receive and process and/or process and transmit information from/to the radioterminal using at least two substantially orthogonally-polarized antennas and/or antenna elements, differently polarized antennas and/or antenna elements and/or spaced-apart antennas and/or antenna elements. In other embodiments, a radioterminal may be configured to communicate with the ATN and/or at least one ATC using a first antenna sub-system, electromagnetic polarization and/or Equivalent Isotropic Radiated Power (EIRP) level of the radioterminal and the radioterminal may further be configured to establish communications with a SBN and/or at least one SBC of the SBN using a second antenna sub-system, electro-magnetic polarization and/or EIRP level In some embodiments, the first and second antenna sub-systems, electro-magnetic polarizations and/or EIRP levels are the same and/or identical or substantially the same and/or identical; in other embodiments, the first and second antenna sub-systems, electromagnetic polarizations and/or EIRP levels differ at least partially. In further embodiments, the at least one ATC is configured to communicate simultaneously with at least two (a first and a second) spaced apart radioterminals in a geographic area using substantially a common set of frequencies (co-channel/co-frequency communications) and being able to discriminate between the communications of the at least two radioterminals by using at least two antenna patterns that are different in a spatial and/or polarization orientation.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of operating a radioterminal communications system including a space-based network comprising a space-based component and an ancillary terrestrial network comprising at least one ancillary terrestrial component, the method comprising:
preferentially communicating between the ancillary terrestrial network and a radioterminal over a first time interval using frequencies from a first and/or second satellite frequency band; and
preferentially communicating between the space-based network and the radioterminal over a second time interval using frequencies from the first and/or second satellite frequency band, wherein the first and second time intervals are non-overlapping.

2. A method according to claim 1, wherein the first satellite frequency band comprises a first one of an L-band of frequencies and an S-band of frequencies and wherein the second satellite frequency band comprises a second one of the L-band of frequencies and the S-band of frequencies.

3. A method according to claim 1, wherein:
the communications between the ancillary terrestrial network and the radioterminal over the first time interval use frequencies from the first and second satellite frequency bands; and
the communications between the space-based network and the radioterminal over a second time interval use frequencies from the first and second satellite frequency bands.

4. A method according to claim 1, wherein the radioterminal is terrestrially located during communications with the ancillary terrestrial network and with the space-based network.

5. A radioterminal communications system comprising:
an ancillary terrestrial network comprising at least one ancillary terrestrial component configured to preferentially communicate with a radioterminal over a first time interval using frequencies from a first and/or second satellite frequency band; and
a space-based network comprising a space-based component configured to preferentially communicate with the radioterminal over a second time interval using frequencies from the first and/or second satellite frequency band, wherein the first and second time intervals are non-overlapping.

6. A system according to claim 5, wherein the first satellite frequency band comprises a first one of an L-band of frequencies and an S-band of frequencies and wherein the second satellite frequency band comprises a second one of the L-band of frequencies and the S-band of frequencies.

7. A system according to claim 5, wherein:
the at least one ancillary terrestrial component is further configured to preferentially communicate with the radioterminal over the first time interval using frequencies from the first and second satellite frequency bands; and
the space-based component is further configured to preferentially communicate with the radioterminal over the second time interval using frequencies from the first and second satellite frequency bands.

8. A system according to claim 5, wherein the radioterminal is terrestrially located during communications with the ancillary terrestrial component and with the space-based component.

9. A radioterminal configured to preferentially communicate with an ancillary terrestrial network over a first time interval using frequencies from a first and/or second satellite frequency band and to preferentially communicate with a space-based network over a second time interval using frequencies from the first and/or second satellite frequency band, wherein the first and second time intervals are non-overlapping.

10. A radioterminal according to claim 9, wherein the first satellite frequency band comprises a first one of an L-band of frequencies and an S-band of frequencies and wherein the second satellite frequency band comprises a second one of the L-band of frequencies and the S-band of frequencies.

11. A radioterminal according to claim 9, wherein the first satellite frequency band comprises a first set of frequencies of an L-band and/or an S-band and wherein the second satellite frequency band comprises a second set of frequencies of the L-band and/or the S-band.

12. A radioterminal according to claim 9 wherein the radioterminal is further configured to preferentially communicate with the ancillary terrestrial network over a first geographic area and/or to preferentially communicate with the space-based network over a second geographic area.

13. A radioterminal according to claim 9 wherein the radioterminal is further configured to radiate and/or receive electro-magnetic waveform(s) to/from the ancillary terrestrial network in a substantially linearly-polarized spatial orientation.

14. A radioterminal according to claim 9, wherein the radioterminal is further configured to preferentially communicate with the ancillary terrestrial network over the first time interval using frequencies from the first and second satellite frequency bands and to preferentially communicate with the space-based network over the second time interval using frequencies from the first and second satellite frequency bands.

15. A radioterminal according to claim 9, wherein the radioterminal is terrestrially located during communications with the ancillary terrestrial network and with the space-based network.

* * * * *